United States Patent [19]

Schwerin

[11] 3,836,205

[45] Sept. 17, 1974

[54] HYDRAULIC BRAKE SYSTEM FOR TRAILERS CONNECTED WITH MECHANICALLY BRAKED TOWING VEHICLES

[75] Inventor: Günther Schwerin, Hohenstaufenstrasse, Germany

[73] Assignee: Robert Bosch GmbH, Stuttgart, Germany

[22] Filed: May 23, 1973

[21] Appl. No.: 363,046

[30] Foreign Application Priority Data
May 25, 1972 Germany............................ 2225357

[52] U.S. Cl..................................... 303/7, 188/3 R
[51] Int. Cl............................................ B60t 13/68
[58] Field of Search........................... 303/7, 15–17, 303/20; 188/3 R

[56] References Cited
UNITED STATES PATENTS

| | | |
|---|---|---|
| 3,507,542 | 4/1970 | Cannella............................ 188/3 R |
| 3,574,414 | 4/1971 | Jacob..................................... 303/7 |
| 3,740,102 | 6/1973 | Schwerin ............................... 303/7 |
| 3,768,870 | 10/1973 | Howard .................................. 303/7 |

*Primary Examiner*—Trygve M. Blix
*Assistant Examiner*—Stuart M. Goldstein
*Attorney, Agent, or Firm*—Michael S. Striker

[57] ABSTRACT

A hydraulic brake system for a trailer which is coupled to a mechanically braked towing vehicle has an electronic regulator circuit receiving signals from a first transducer which indicates the magnitude of the mechanical braking force and from a second transducer which indicates the fluid pressure in the cylinder or cylinders of the hydraulic brake system. The output of the regulator circuit is connected to one or more electromagnetic control valves which control a distributor valve serving to connect the pump with the brake cylinder or cylinders, with a return line and/or with one or more consumers. The regulator circuit insures that the fluid pressure in the brake cylinder or cylinders is always proportional to the mechanical braking force.

12 Claims, 4 Drawing Figures

HYDRAULIC BRAKE SYSTEM FOR TRAILERS CONNECTED WITH MECHANICALLY BRAKED TOWING VEHICLES

BACKGROUND OF THE INVENTION

The present invention relates to brake systems for trailers which can be hitched to tractors or analogous self-powered towing vehicles. More particularly, the invention relates to improvements in hydraulic brake systems for trailers which are to be pulled by towing vehicles having non-hydraulic (normally mechanical) brake means.

It is already known to provide a trailer with a hydraulic brake system which is applied in automatic response to actuation of brake means for the towing vehicle, i.e., the actuation of brake means for the towing vehicle triggers the operation of the hydraulic brake system. In accordance with a presently known proposal, the hydraulic brake system comprises a valve body having an inlet connected with a pump which supplies pressurized fluid, a first outlet connected to a consumer (e.g., a hydraulic jack), a second outlet connected with the cylinder or cylinders of the hydraulic brake system, and a third outlet which is connected to a reservoir for hydraulic fluid. The mechanical brake means of the towing vehicle comprises two parallel drawbars coupled to a swingable lever which is directly connected to and can actuate a valve for admission of pressurized fluid to the second outlet. The pedal which is depressed when the operator wishes to brake the towing vehicle is coupled to the drawbars by way of a camshaft. A drawback of such brake systems is that the hydraulic braking action is not exactly proportional to the mechanical braking action. Moreover, and since the customary valve block of an agricultural tractor is normally installed at a level above the brake means for the tractor, the mounting of the aforementioned valve in or on the valve block presents serious problems because the connection between the valve and the pedal is complex and cannot be installed in the area which is normally available in the towing vehicle.

It is further known to provide a throttle valve in the linkage between the brake pedal and the braking means of a towing vehicle. The throttle valve is installed in a return line connecting a reservoir with the inlet of a valve block for admission of pressurized fluid to the brake cylinder of the trailer and serves to change the pressure of fluid in a control chamber proportionally with the extent of depression of the brake pedal. The throttle valve is remote from the control chamber and from the valve block so that these parts must be connected to each other by a number of conduits for pressurized fluid. Moreover, the throttle valve should not interfere with actuation of mechanical brake means for the towing vehicle which complicates the installation of the throttle valve. Still further, the valve block must be provided with several complex distributor valves including a fluid flow controlling valve and a reversing valve. All this contributes to complexity, sensitivity and initial as well as maintenance cost of such brake systems.

SUMMARY OF THE INVENTION

An object of the invention is to provide a novel and improved hydraulic brake system which can be used with advantage on trailers for attachment to non-hydraulically braked towing vehicles and which is not only simpler, more compact and less expensive but also more reliable than heretofore known brake systems.

Another object of the invention is to provide a hydraulic brake system for trailers whose braking action is always proportional to the braking action of the braking means for the towing vehicle.

A further object of the invention is to provide a hydraulic brake system which is capable of reacting practically instantaneously to the actuation or deactivation of brake means for the towing vehicle, wherein the losses in pressurized fluid are minimal, and which can be readily adjusted to furnish an optimum braking force in any given situation.

An additional object of the invention is to provide a novel and improved operative connection between the non-hydraulic braking means of a towing vehicle and the hydraulic brake system for a tailer.

The invention is embodied in a hydraulic brake system for a trailer which is attached to a towing vehicle having non-hydraulic (preferably or normally mechanical) brake means and means for actuating the brake means with a variable force. The hydraulic brake system comprises a brake having a brake cylinder, a source of pressurized fluid, a valve assembly interposed between the source and the brake cylinder, first signal generating means for furnishing first signals having characteristics indicating the magnitude of the force which is applied for actuation of the brake means for the towing vehicle, second signal generating means for furnishing second signals having characteristics indicating the fluid pressure in the cylinder of the brake for the trailer, and regulator means connected with the first and second signal generating means and being operative to actuate the valve assembly in response to the first and second signals so that the fluid pressure in the cylinder is proportional to the magnitude of the aforementioned force.

The regulator means preferably comprises an electronic circuit which receives electric signals from the two signal generating means and controls one or more electromagnetic valves forming part of the valve assembly.

The novel features which are considered as characteristic of the invention are set forth in particular in the appended claims. The improved hydraulic brake system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
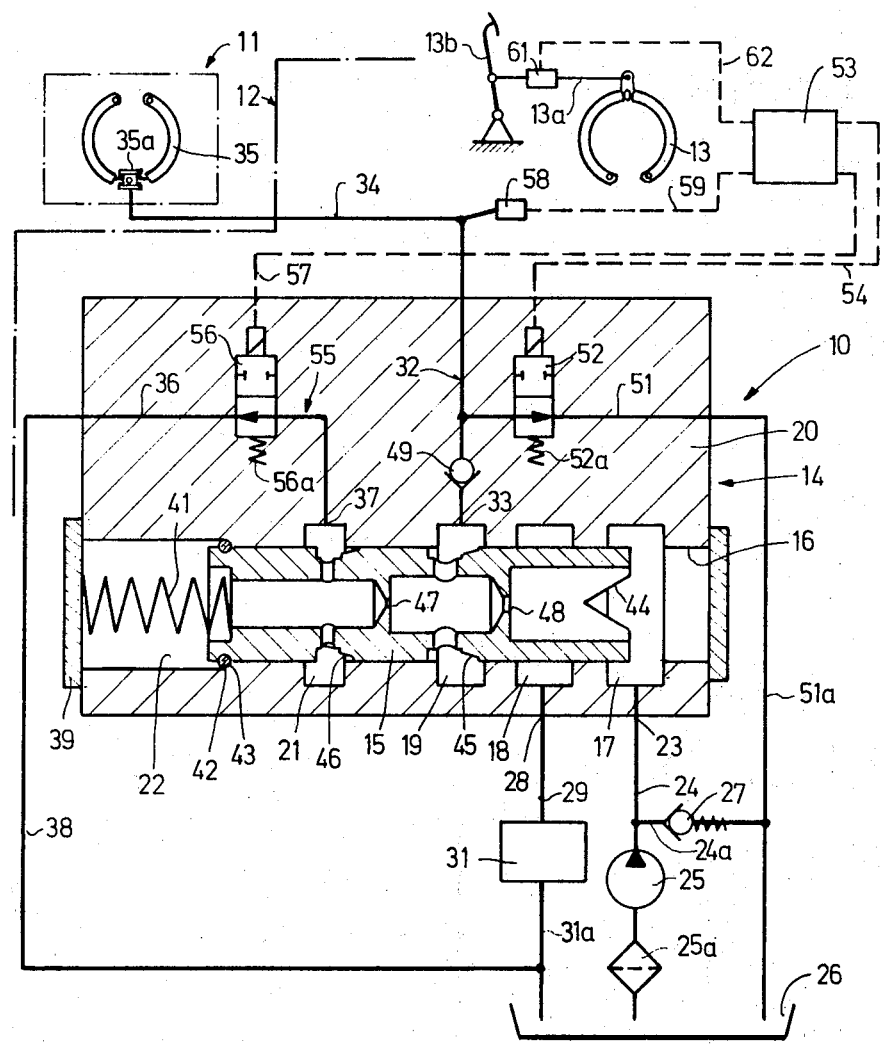
FIG. 1 is a partly diagrammatic and partly sectional view of a hydraulic brake system which embodies one form of the invention and serves to brake a trailer which is attached to a mechanically braked towing vehicle.

FIG. 1 illustrates a hydraulic brake system 10 for a trailer 11 which is assumed to be attached to and to be pulled by a towing vehicle 12, preferably an agricultural tractor. The tractor or towing vehicle 12 is provided with mechanical braking means 13 which can be actuated by a mechanical linkage 13a including a brake pedal 13b.

The brake system 10 of the trailer 11 comprises a valve assembly 14 having a body or housing 20 provided with a bore 16 for an axially reciprocable hollow valve member or spool 15 forming part of a distributor valve. The valve member 15 is movable in the bore 16 with minimal clearance, and the bore 16 includes several enlarged portions or chambers constituted by annular grooves which are machined into the internal surface of the valve body 20. These chambers include an inlet chamber 17, a consumer chamber 18, a brake chamber 19, a control chamber 21 and a plenum chamber 22. The inlet chamber 17 communicates with an inlet 23 which is machined into the body 20 of the valve assembly 14 and is connected with the outlet of a source of pressurized fluid, here shown as a hydraulic pump 25, by way of a supply conduit 24. The pump 25 is driven by a motor (not shown) and draws hydraulic fluid (preferably oil) from a reservoir or tank 26 through a suitable filter 25a. The supply conduit 24 communicates with a return conduit 24a containing a pressure relief valve 27 which allows hydraulic fluid to flow back into the tank 26 when the pressure of fluid at the outlet of the pump 25 rises to a predetermined maximum permissible value.

The consumer chamber 18 communicates with a first outlet 28 which is machined into the body 20 of the valve assembly 14 and is connected with a consumer 31 by way of a conduit 29. The consumer 31 has an outlet which is connected to the tank 26 by way of a line 31a.

The consumer 31 may constitute a hydraulic jack for a plow which is articulately connected to the towing vehicle 12. This consumer is assumed to comprise a suitable distributor valve (not shown) and a hydraulic cylinder and piston unit which receives and discharges fluid by way of the distributor valve. When in neutral position, the distributor valve of the consumer allows fluid to flow from the conduit 29 into the line 31a. The consumer 31 may also constitute a power mower on the towing vehicle 12, a universal jack on the towing vehicle, or any other piece of hydraulically operated auxiliary equipment.

The brake chamber 19 communicates with a second outlet 33 provided in the body or housing 20 and connected to the brake cylinder 35a of the brake 35 on the trailer 11 by a composite brake line including a channel 32 in the body 20 and a conduit 34. The channel 32 contains a one-way ball check valve 49 which prevents the flow of fluid from the cylinder 35a to the outlet 33.

The control chamber 21 communicates with a third outlet 37 provided in the body 20 and connected to the tank 26 by a composite control line 55 including a channel 36 in the body 20 and a conduit 37.

The left-hand end of the plenum chamber 22 in the body 20 is sealed by a cover or lid 39. The chamber 22 receives a biasing means here shown as a helical spring 41 which reacts against the cover 39 and urges the valve member 15 in a direction to the right, as viewed in FIG. 1. The left-hand end portion of the valve member 15 has a circumferential groove for a split ring 42 which abuts against a stop 43 in the body 20 when the spring 41 is free to expand. FIG. 1 shows the split ring 42 in abutment with the stop 43, i.e., the valve member 15 is shown in its first or rightmost position.

The right-hand end face of the valve member 15 is provided with one or more triangular notches bounded by a fluid-flow controlling surface 44 which determines the rate of fluid flow from the inlet 23 to the first outlet 28. A second fluid flow-controlling surface 45 is provided on the valve member 15 in the region of the brake chamber 19 to determine the rate of fluid flow from the inlet 23 to the outlet 33, and a third fluid-flow controlling surface 46 is provided on the valve member 15 in the region of the control chamber 21 to determine the rate of fluid flow from the inlet 23 to the outlet 37. The valve member 15 is further provided with a first flow restrictor 47 located between the fluid-flow controlling surfaces 45 and 46, and with a second flow restrictor or diaphragm 48 between the fluid-flow controlling surfaces 44 and 45. The cross-sectional area of the flow restrictor 47 is smaller than that of the flow restrictor 48. The fluid-flow controlling surfaces 44, 45, 46 of the valve member 15 and the corresponding fluid-flow controlling surfaces in the body 20 are configurated and distributed in such a way that, when the valve member 15 assumes the illustrated first or right-hand end position, the inlet 23 of the body 20 communicates with the second and third outlets 33, 37 but is sealed from the first outlet 28. When the valve member 15 is shifted in a direction to the left, as viewed in FIG. 1, so as to stress the spring 41 in the plenum chamber 22, it can assume a range of second positions in each of which the inlet 23 is in communication with the first and second outlets 28 and 33. If the valve member 15 is moved further in a direction toward the cover 39, it can assume at least one third position in which the inlet 23 is in communication with the first outlet 28 but is sealed from the second outlet 33. At the same time, the surface 46 throttles the flow of fluid from the inlet 23 to the third outlet 37.

The channel 32 in the body 20 of the brake valve 14 communicates with a bypass channel 51 which forms part of a composite return line further including a conduit 51a and serving to convey fluid back into the tank 26. The channel 51 receives a first normally open electromagnetic two-way control valve 52 which can permit or prevent a return flow of hydraulic fluid from the channel 32, conduit 34 and cylinder 35a into the tank 26. The solenoid of the control valve 52 is energizable by an electronic regulator circuit 53 which is connected with the control valve 52 by conductor means 54 indicated by a broken line.

The channel 36 of the control line 55 contains a second normally open electromagnetic two-way control valve 56 having a solenoid which is connected to the electronic regulator circuit 53 by conduit means 57 represented in FIG. 1 by a single broken line.

The conduit 34 which supplies pressurized fluid to the cylinder 35a of the brake 35 for the trailer 11 is connected with a signal generator 58 capable of transmitting to the electronic regulator circuit 53 electric signals by way of conductor means 59. The signal generator 58 is a transducer capable of producing electric signals whose intensity is proportional to the pressure $P_A$ of fluid in the brake line 32, 34 and cylinder 35a. For example, the signal generator 58 may contain a diaphragm which can be flexed by hydraulic fluid in the conduit 34 and forms part of an inductance or capacitance capable of furnishing electric signals whose intensity is proportional to fluid pressure $P_A$ in the cylinder 35a of the brake 35.

A second signal generator or transducer 61 is operatively connected with the linkage 13a which actuates the mechanical brake 13 of the towing vehicle 12. The signal generator 61 furnishes to the regulator circuit 53 signals by way of conductor means 62; the intensity of such signals indicates the magnitude of mechanical braking force $P_Z$ which is being applied to the brake 13. For example, the signal generator 61 may constitute a potentiometer whose sliding contact is connected with the brake pedal 13b.

The operation is as follows:

If the mechanical brake 13 of the towing vehicle 12 is idle, the electromagnetic control valves 52 and 56 are open. Thus, the bypass channel 51 connects the conduit 34, the cylinder 35a and the channel 32 with the conduit 51a, and the control chamber 21 of the body 20 is in communication with the outlet 37 and hence with the conduit 38 of the control line 55. The valve members of the control valves 52 and 56 are held in open positions by the respective springs 52a and 56a. If the pump 25 draws fluid from the reservoir or tank 26 while the electromagnetic control valves 52 and 56 are open, pressurized fluid flows in the supply conduit 24 through the inlet 23 and inlet chamber 17, through the hollow valve member or spool 15 and its flow restrictors 48, 47, along the fluid-flow controlling surface 46, through the control chamber 21 and control line 55, and back into the tank 26. The flow restrictor 47 produces a pressure differential between the left-hand and right-hand portions of the axial passage in the valve member 15. Consequently, the fluid pressure in the right-hand portion of the valve member 15 causes the latter to move in a direction to the left, as viewed in FIG. 1, and to stress the spring 41 in the plenum chamber 22. The valve member 15 then assumes its third position in which the fluid-flow controlling surface 44 of the valve member 15 allows pressurized fluid to flow from the inlet 23 to the first outlet 28 and to the consumer 31. In the third position of the valve member 15, the flow of fluid to the consumer 31 is practically unobstructed. At the same time, the fluid-flow controlling surface 45 of the valve member 15 seals the inlet 23 from the outlet 33. The third fluid-flow controlling surface 46 reduces the rate of fluid flow from the interior of the valve member 15 into the control line 55. This insures that a relatively small stream of fluid flows through the control line 55 at a constant rate. It will be noted that, in its third position, the valve member 15 acts not unlike a flow limiting valve.

Figure 2:
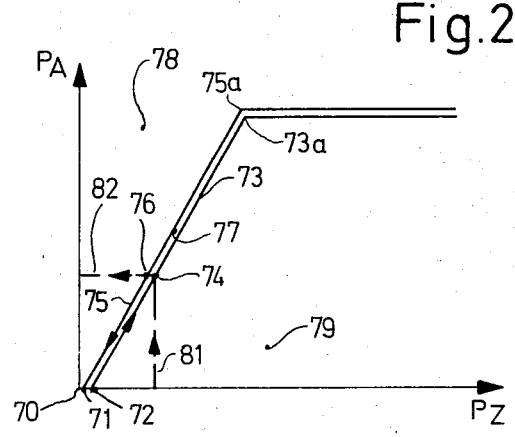
FIG. 2 is a diagram illustrating the operation of the regulating means in the brake system of FIG. 1.

If the mechanical brake 13 of the towing vehicle 12 is applied gradually, i.e., if the brake pedal 13b of the linkage 13a is depressed at a constant rate, the signal generator 61 produces a signal indicating the magnitude of mechanical braking force $P_Z$ which is being applied to the brake 13 of the towing vehicle 12. Such signal is transmitted to the corresponding input of the electronic regulator circuit 53 by way of the condutor means 62. At the same time, the signal generator 58 furnishes to the regulator circuit 53 a signal (by way of conductor means 59) which indicates that the pressure $P_A$ of hydraulic fluid in the conduit 34 is zero (because the control valve 52 is open). When the intensity of the signal which is furnished by the signal generator 61 rises from zero intensity (indicated at 70 in FIG. 2) to the valve 71, the regulator circuit 53 furnishes at one of its outputs a signal which is transmitted to the control valve 52 by way of conductor means 54 so that the control valve 52 closes and prevents the flow of hydraulic fluid from the channel 32 into the bypass channel 51 and conduit 51a of the return line. The regulator circuit 53 closes the second electromagnetic control valve 56 by way of the conductor means 54 when the intensity of signal furnished by the signal generator 61 reaches the value 72 shown in FIG. 2. Thus, the valve 56 closes subsequent to closing of the valve 52. The flow of fluid in the control passage 55 (i.e., from the flow restrictor 47 to the tank 26 by way of the outlet 37) is interrupted as soon as the electromagnetic control valve 56 closes in response to a signal which is transmitted via conductor means 57. The spring 41 in the plenum chamber 22 of the body 20 is then free to expand and shifts the valve member 15 to one of its second positions in which the fluid-flow controlling surface 44 of the valve member 15 throttles the flow of fluid between the inlet 23 and the interior of the valve member 15 at a rate which is a function of the axial position of the valve member 15. In other words, the surface 44 then restricts the flow of fluid from the inlet 23 to the conduit 29 and consumer 31. At the same time, the fluid-flow controlling surface 45 of the valve member 15 connects the inlet 23 with the second outlet 33 so that the conduit 34 receives pressurized hydraulic fluid. The pressure which builds up at the inlet 23 is communicated to fluid in the conduit 34 and in the cylinder 35a of the brake 35. The rise of fluid pressure in the conduit 34 of the brake line is detected by the signal generator 58 which transmits an appropriate signal to the regulator circuit 53 by way of the conductor means 59. The gradual rise of mechanical force $P_Z$ which is being applied to the brake 13 of the towing vehicle 12 is indicated in FIG. 2 by the line 73. When the mechanical force $P_Z$ reaches the value 74 shown in FIG. 2, the intensity of signal furnished by the signal generator 58 reaches the value 76 which is indicative that the mechanical braking force which is being applied to the brake 13 is proportional to or matches the hydraulic braking force that is being applied by the brake 35 of the trailer 11. The regulator circuit 53 then opens the control valve 56 by transmitting a signal through the conductor means 57. The check valve 49 in the channel 32 of the body 20 prevents a return flow of pressurized fluid from the conduit 34 and cylinder 35a into the chamber 19 as long as the control valve 52 remains closed. Thus, the fluid pressure $P_A$ in the cylinder 35a of the brake 35 for the trailer 11 remains constant. When the control valve 56 opens, it allows a stream of fluid to flow through the control passage 55 and back to the tank 26. The valve member 15 is then shifted by pressurized fluid upstream of the flow restrictor 47 so that it stresses the spring 41 and allows fluid to flow from the inlet 23 to the first outlet 28 and thence into the chamber 31.

If the pressure upon the brake pedal 13b is thereupon gradually relaxed, the signal generator 61 transmits an appropriate signal via conductor means 62 to indicate a drop in magnitude of the braking force $P_Z$ which is being applied to the brake 13 of the towing vehicle 12. Consequently, the intensity of signal furnished by the signal generator 61 decreases below the intensity of signal furnished by the signal generator 58. This causes the regulator circuit 53 to gradually reduce the pressure of hydraulic fluid in the brake 35 as indicated by the line 75, namely from the point 76 back to the point 71. Such reduction of fluid pressure in the conduit 34 and cylinder 35a takes place in response to opening of the electromagnetic control valve 52 whereby the fluid which was entrapped in the conduit 34 by the check valve 49 is free to flow back to the tank 26 by way of the control valve 52, bypass channel 51 and conduit 51a. The consumer 31 preferably receives hydraulic fluid during outflow of fluid from the conduit 34 into the tank 26.

The area 77 between the lines 73 and 75 of the diagram shown in FIG. 2 indicates that stage of operation of the brake system 10 for the trailer 11 when the first control valve 52 is closed and the second control valve 56 is open. The area 78 between the line 75 and the ordinate of the diagram shown in FIG. 2 indicates that stage of operation of the brake system 10 when the control valves 52 and 56 are open. The area 79 indicates that stage of operation when the control valves 52 and 56 are closed. The area 79 extends between the line 73 and the abscissa of the diagram shown in FIG. 2. It will be noted that only three combinations of conditions of the electromagnetic control valves 52 and 56 are sufficient to insure a proper operation of the brake system 10, depending upon whether or not the intensity of signal furnished by the signal generator 61 exceeds, is equal to or is less than the intensity of signal furnished by the generator 58.

The first stage (area 77) brings about a certain amount of hysteresis in the hydraulic brake system 10. Such hysteresis is characteristic of mechanical braking systems and the hysteresis of the brake system 10 is comparable to hysteresis in mechanical brake systems. The maximum mechanical braking force is reached at the point 73a. The corresponding magnitude of the hydraulic braking force is indicated at 75a. It will be noted, that the maximum mechanical braking force (furnished by the brake 13) of the towing vehicle 12 and the maximum hydraulic braking force (furnished by the brake 35 for the trailer 11) can be reached without resorting to additional valves. The very small distance between the point 71 on the line 75 and the zero point 70 is indicative of an accurately defined open position of the first electromagnetic control valve 52 when the mechanical brake 13 of the towing vehicle 12 is not applied. The illustrated minimal displacement of the characteristic curves or lines 73, 75 from the zero point 70 does not adversely affect the operation of the brake system 10.

If the driver of the towing vehicle 12 decides to abruptly depress the brake pedal 13b, the magnitude of the braking force $P_z$ increases along the line 81 shown in the diagram of FIG. 2 or along a line which extends between the line 81 and the curve 73. When the brake pedal 13b is allowed to suddenly return to its zero or starting position, the reduction of mechanical braking force can take place in a manner as indicated by the line 82 which extends from the point 76 of the curve 75 shown in FIG. 2. Alternatively, a decrease in the magnitude of mechanical braking force can take place anywhere in the area between the line 82 and the curve 75 shown in the diagram of FIG. 2. These changes in mechanical braking force take place at such a rapid rate that the change of fluid pressure in the conduit 34 and cylinder 35a can be normally effected continuously in a manner as indicated by the characteristic curves 73 and 75 of FIG. 2. In other words, the drop of fluid pressure $P_4$ in the conduit 34 will be a function of the drop of mechanical force $P_z$ which is being applied by the linkage 13a. The two slanting portions of the curves 73 and 75 indicate a substantial proportionality between the two braking forces. Those portions of the curves 73 and 75 which are parallel to the abscissa of the diagram shown in FIG. 2 indicate the maximum mechanical and hydraulic braking forces.

It is clear that the regulator circuit 53 can be readily adjusted so that it can change the configuration and/or inclination of the characteristic curves 73 and 75 as necessary for a particular tractor-trailer combination.

A further advantage of the brake system 10 is that the regulation of fluid pressure in the conduit 34 is not dependent on the exact pressure of fluid which is being furnished by the source 25. In other words, the pressure of fluid which is being furnished by the pump 25 can fluctuate within a rather wide range.

Figure 3:
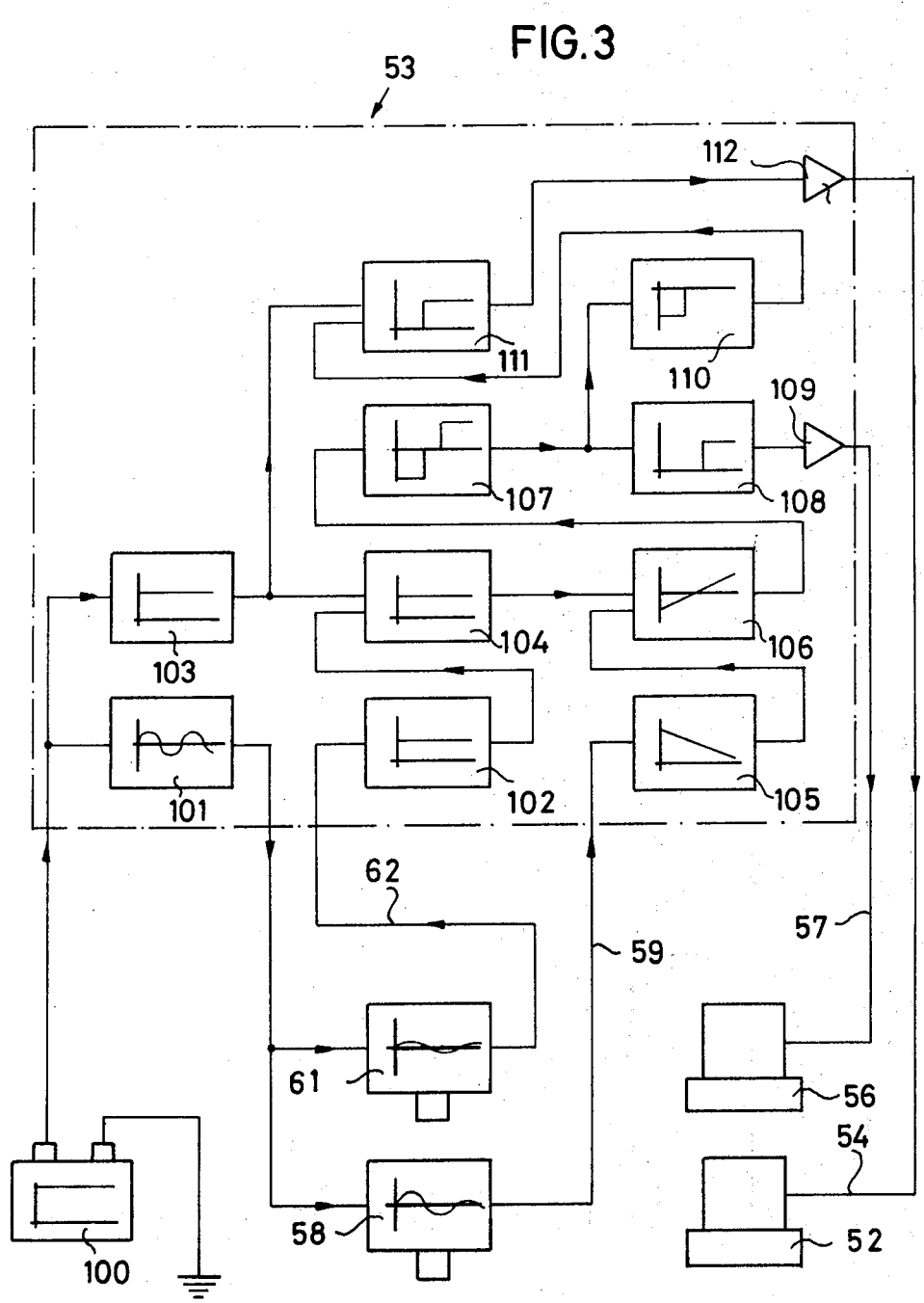
FIG. 3 is a circuit diagram of the regulating means.

FIG. 3 illustrates the control valves 52, 56, the signal generators 58, 61, a source 100 of DC current (e.g., a battery), and one embodiment of the regulator circuit 53. The energy source 100 is connected with the input of a DC-AC converter 101 and with the input of a voltage-reducing or level changer circuit 103. The intensity of signal furnished by the output of the circuit 103 corresponds to that mechanical braking force which is represented by the horizontal portion of the curve 73 shown in FIG. 2. The output of the inverter 101 is connected to the inputs of the signal generators 58, 61. The output of the signal generator 58 furnishes signals (via conductor means 59) to the input of a DC-AC converter 105 which is connected with one input of a signal comparing circuit 106. The output of the signal generator 61 is connected (via conductor means 62) to the input of an AC-DC converter 102 which is connected to one input of a signal selector circuit 104. The other input of the circuit 104 receives a signal from the voltage reducing circuit 103, and its purpose is to discriminate between the signals from the circuit 103 and converter 102 and to transmit the lower-voltage signal to the other input of the circuit 106.

The output of the circuit 106 is connected to the input of a pulse shaper circuit 107 which furnishes rectangular pulses to the input of an amplifier circuit 108 which amplifies the positive parts of rectangular pulses. The circuit 107 furnishes rectangular pulses only when the intensity of signals transmitted by the circuit 106 deviates by a selected value from a zero value. The circuit 107 establishes the basis for the contour of the curve 73 shown in FIG. 2. The output of the circuit 108 is connected with a power amplifier 109 which is in circuit with the solenoid of the valve 56 (see the conductor means 57).

The output of the pulse shaper circuit 107 is further connected to one input of a circuit 110 which suppresses the positive parts of the rectangular pulses and whose output is connected to the input of a totalizer circuit 111. The latter totals the DC voltage (see the other input of the circuit 111 which is connected to the output of the voltage reducing circuit 103) and the negative parts of the rectangular pulses so that only positive parts remain. These positive parts are amplified by a power amplifier 112 which is in circuit with the solenoid of the valve 52 via conductor means 54.

The mode of operation of the just described regulator circuit 53 of FIG. 3 will be readily understood upon perusal of the preceding disclosure.

Figure 4:
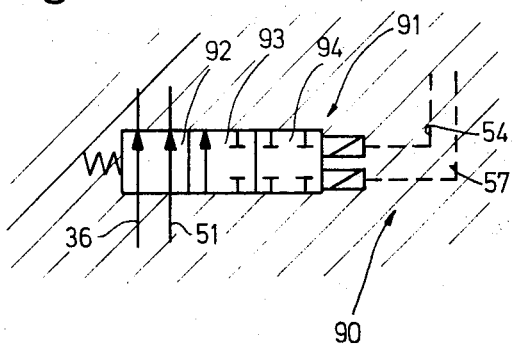
FIG. 4 is a fragmentary sectional view of a modified valve assembly for use in the improved hydraulic brake system.

FIG. 4 illustrates a portion of a modified valve assembly 90 wherein the two discrete electromagnetic control valves 52 and 56 of FIG. 1 are replaced by a single control valve 91 which is a four-way, 3-position electromagnetic valve. The three positions or settings of this control valve are respectively indicated at 92, 93 and 94. These settings correspond to the areas 78, 77 and 79 shown in the diagram of FIG. 2. Otherwise, the operation of the brake system including the valve assembly 90 is identical with that of the brake system 10 shown in FIG. 1.

It will be noted that the control valves 52, 56 constitute two discrete portions of a control valve means in the valve assembly 14 whereas the valve 91 constitutes a unitary control valve means of the valve assembly 90.

The hydraulic brake system of the present invention can be utilized in trailers which are coupled to mechanically braked towing vehicles or to towing vehicles having any other non-hydraulic type of braking means. Were the towing vehicle 12 provided with a hydraulic brake, the braking system of the trailer could receive fluid directly from the brake of the towing vehicle so that the electronic regulator circuit 53 and the signal generators 58, 61 would serve no useful purpose. Pneumatic brakes for vehicles which are used for the towing of trailers are not customary at this time; therefore, the brake system of the present invention will find a preferred use in trailers which are hitched to mechanically braked towing vehicles.

An important advantage of the improved hydraulic brake system is that its parts can be readily installed in spaces which are available in or on the towing vehicle and trailer. Moreover, the conduits for hydraulic fluid which are used in conventional brake systems are replaced with much simpler electrical conductor means. The electromagnetic control valve (91) or valves (52, 56) can be installed directly in or on the body 20 of the valve asssembly 90 or 14, and the body 20 can be installed in or on the consumer 31.

The improved brake system exhibits the additional advantage that is employs a single distributor valve (valve member 15) which is controlled by a single electromagnetic valve (91) or by two very simple discrete electromagnetic valves (52, 56). Also, the losses in fluid are minimal because, when the braking force furnished by the mechanical brake 13 is constant, the flow of pressurized fluid to the consumer 31 is practically unobstructed. Still further, the maximum pressure of fluid in the cylinder 35a can be selected at will by the simple expedient of adjusting the relief valve 27 and/or by causing the regulator circuit 53 to open the valve 52 (or the corresponding portion of the valve 91) when the intensity of signal furnished by the signal generator 58 reaches a preselected value.

Without further analysis, the foregoing will so fully reveal the gist of the present invention that others can, by applying current knowledge, readily adapt it for various applications without omitting features which, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended.

1. A hydraulic brake system for a trailer which is attached to a towing vehicle having non-hydraulic brake means, particularly mechanical brake means, and a mechanical linkage for actuating said brake means with a variable force, said brake system comprising a brake having a brake cylinder; a source of pressurized fluid; a valve assembly interposed between said cylinder and said source; a valve assembly interposed between said cylinder and said source; first signal generating means arranged to furnish first signals whose characteristics are indicative of the magnitude of said force; second signal generating means arranged to furnish second signals whose characteristics are indicative of the fluid pressure in said cylinder; regulator means connected with said first and second signal generating means and being operative to actuate said valve assembly in response to said signals so that the fluid pressure in said cylinder is related to the magnitude of said force, said first signal generating means comprising a first transducer actuated by said linkage and arranged to furnish to said regulator means first electric signals whose intensity is proportional to the magnitude of said force and said second signal generating means comprising a second transducer responsive to fluid pressure in sayd cylinder and arranged to furnish to said regulator means second electric signals whose intensity is proportional to said pressure; a reservoir for fluid; and a consumer of pressurized fluid, said valve assembly having an inlet connected with said source, a first outlet connected with said consumer, a second outlet, a brake line connecting said second outlet with said cylinder, a third outlet connected with said reservoir, a distributor valve having a valve member movable between a plurality of positions to thereby control the flow of fluid between said inlet and said outlets, control valve means connected with and actuatable by said regulator means to effect the movements of said valve member between said positions and to change the fluid pressure in said cylinder, one-way valve means provided in said brake line to prevent the flow of fluid from said cylinder to said second outlet, and a return line connecting said reservoir with said brake line intermediate said one-way valve means and said cylinder, said control valve means including a portion provided in said return line and actuatable by said regulator means to permit the flow of fluid from said cylinder to said reservoir in response to decreasing intensity of said first signals.

2. A system as defined in claim 1, wherein said portion of said control valve means is normally open.

3. A system as defined in claim 1, wherein said regulator means includes means for permitting the flow of fluid from said cylinder to said reservoir by way of said portion of said control valve means in response to a predetermined maximum intensity of said second signals.

4. A system as defined in claim 1, wherein said control valve means further comprises a second portion provided between said third outlet and said reservoir and arranged to permit the fluid to flow from said third outlet to said reservoir when the intensity of said first signals is constant.

5. A system as defined in claim 4, wherein said valve assembly further comprises biasing means for urging said valve member to a first position in which said inlet communicates with said second outlet but is sealed from said first outlet, said valve member being movable to at least one second position in which said inlet communicates with said first and second outlets and to at least one third position in which said inlet is sealed from said second outlet but communicates with said first outlet.

6. A system as defined in claim 5, wherein said valve member is a hollow spool and said distributor valve comprises a housing wherein said spool is movable lengthwise between said positions thereof, said housing defining a plenum chamber and said biasing means being located in said plenum chamber and acting against one end of said spool, said spool having at the other end thereof a first surface arranged to control the flow of fluid between said inlet and said first outlet and said spool further having second and third surfaces respectively arranged to control the flow of fluid between said inlet and said second and third outlets, said valve assembly further comprising flow restrictor means provided in said spool between said other end and said third surface.

7. A system as defined in claim 6, wherein said flow restrictor means is provided in said spool between said second and third surfaces and said valve assembly further comprises second flow restrictor means provided in said spool between said first and second surfaces.

8. A system as defined in claim 4, wherein each portion of said control valve means is a discrete electromagnetic two-way valve.

9. A system as defined in claim 8, wherein said discrete valves are normally open.

10. A system as defined in claim 4, wherein said control valve means comprises a single electromagnetic four-way three-position valve.

11. A system as defined in claim 4, wherein said regulator means is arranged to interrupt the flow of fluid between said second outlet and said reservoir by way of said first mentioned portion of said control valve means in response to increasing intensity of said first signals and to thereupon interrupt the flow of fluid from said third outlet to said reservoir by way of said second portion of said control valve means.

12. A system as defined in claim 1, wherein said regulator means comprises means for effecting an increase of fluid pressure in said cylinder at the rate at which said actuating means increases said force.

* * * * *